US008047161B2

(12) United States Patent
Moore

(10) Patent No.: US 8,047,161 B2
(45) Date of Patent: Nov. 1, 2011

(54) METHOD AND DEVICE FOR DETERMINING THE POLARITY OF A SIGNAL TRANSMITTED BY AN ANIMAL CONTAINMENT SYSTEM

(75) Inventor: William P. Moore, Fort Wayne, IN (US)

(73) Assignee: Radio Systems Corporation, Knoxville, TX (US)

( * ) Notice: Subject to any disclaimer, the term of this patent is extended or adjusted under 35 U.S.C. 154(b) by 867 days.

(21) Appl. No.: 12/013,018

(22) Filed: Jan. 11, 2008

(65) Prior Publication Data

US 2008/0168950 A1 Jul. 17, 2008

Related U.S. Application Data

(60) Provisional application No. 60/885,344, filed on Jan. 17, 2007.

(51) Int. Cl.
*G08B 23/00* (2006.01)
(52) U.S. Cl. ..................................... 119/721; 340/573.3
(58) Field of Classification Search .................. 119/719, 119/720, 721; 340/573.3
See application file for complete search history.

(56) References Cited

U.S. PATENT DOCUMENTS

| 5,794,569 | A | 8/1998 | Titus et al. | |
|---|---|---|---|---|
| 6,415,742 | B1 * | 7/2002 | Lee et al. | 119/721 |
| 6,600,422 | B2 * | 7/2003 | Barry et al. | 340/573.3 |
| 6,657,544 | B2 * | 12/2003 | Barry et al. | 340/573.3 |

* cited by examiner

*Primary Examiner* — Joshua Michener
*Assistant Examiner* — Brian M O'Hara
(74) *Attorney, Agent, or Firm* — Pitts, Lake & Bell, PC

(57) ABSTRACT

Described is an animal containment system for containing an animal within a boundary, for maximizing the animal's usable area within the boundary, for not discouraging the animal from returning to within the boundary in the event the animal moves beyond the boundary, and for doing so without utilizing an independent polarity indicator. The animal containment system determines whether the animal is within the boundary or beyond the boundary by considering the polarity of an activation signal the animal containment system transmits from the boundary and receives at the location of the animal. The animal containment system determines the polarity of the activation signal by modulating the signal such that the modulation indicates the polarity of the activation signal. The animal containment system achieves the above-discussed features by delivering a stimulus to the animal only when it traverses the boundary from within the boundary.

16 Claims, 5 Drawing Sheets

METHOD AND DEVICE FOR DETERMINING THE POLARITY OF A SIGNAL TRANSMITTED BY AN ANIMAL CONTAINMENT SYSTEM

CROSS-REFERENCE TO RELATED APPLICATIONS

This application claims the benefit of U.S. Provisional Application No. 60/885,344, filed Jan. 17, 2007.

STATEMENT REGARDING FEDERALLY SPONSORED RESEARCH OR DEVELOPMENT

Not Applicable

BACKGROUND OF THE INVENTION

1. Field of the Invention

This invention pertains to a method and device for determining the polarity of a signal generated and transmitted by an animal containment system. More particularly, this invention pertains to a method and device for determining the polarity of the signal at the location of an animal.

2. Description of the Related Art

Conventional pet containment systems typically include a transmitter unit, a wire, and a receiver unit. The wire defines a perimeter such as, for example, the perimeter of a pet owner's yard. The transmitter unit is in electrical communication with the wire and transmits a signal by way of the wire such that the signal generates a magnetic field that rotates about the wire. The receiver unit is carried by a pet and is responsive to the signal transmitted by way of the wire. More specifically, when the pet approaches the wire, the signal strength at the receiver unit increases until it exceeds a predefined threshold, which occurs some distance from the wire. When the signal strength at the receiver unit exceeds the threshold, the receiver unit delivers a stimulus to the pet, discouraging the pet from leaving the pet owner's yard.

The above-discussed conventional pet containment systems are limited in that the receiver unit delivers a stimulus to the pet when the pet is some distance from the wire, which defines the perimeter of the pet owner's yard. Consequently, the pet does not have unfettered access to the entire yard. Additionally, conventional pet containment systems of this sort present confusion to a pet when visible physical boundaries, such as a fence, are located at the perimeter of the yard.

Other conventional pet containment systems address the above-discussed limitation by decreasing the strength of the signal transmitted from the wire such that the distance from the wire at which the signal strength at the receiver unit exceeds the threshold is decreased, increasing the portion of the yard to which the pet has unfettered access. However, when that distance is decreased, the risk of the pet escaping the conventional pet containment system is increased. More specifically, the distance from the wire at which the signal strength at the receiver unit exceeds the threshold must be sufficiently large such that when the pet is running toward the wire, the receiver unit delivers a stimulus to the pet for a period of time sufficient to stop the pet's advancement toward the wire before the pet traverses the wire and moves the distance beyond the wire at which the signal strength at the receiver unit does not exceed the threshold. When this distance is not sufficiently large, the pet can easily, and even accidentally, move beyond the perimeter of the yard to the extent that the receiver unit does not deliver a stimulus to the pet. Additionally, when this occurs, the pet cannot reenter the yard without the receiver unit delivering a stimulus to the pet. This confuses the pet and encourages the pet to remain outside the yard.

Addressing the above-discussed limitations of conventional animal containment systems, U.S. Pat. No. 5,794,569, issued to Titus et al. on Aug. 18, 1998, ("the '569 patent") discloses the conventional animal containment system discussed above where the receiver unit is adapted to detect the polarity of the signal transmitted by way of the wire. Because the transmitted signal generates a magnetic field that radiates from the wire, the signal rotates about the wire such that the polarity of the signal at one side of the wire is substantially opposite the polarity of the signal at the opposite side of the wire. Stated differently, the polarity of the signal at a location within the perimeter is substantially opposite the polarity of the signal at a location outside the perimeter. The system of the '569 patent detects the polarity of the signal at the location of the receiver unit by transmitting an independent polarity pulse as part of the signal transmitted by way of the wire. The polarity pulse serves no purpose but to indicate to the receiver unit the polarity of the signal at the receiver unit. The receiver unit of the '569 patent delivers a stimulus to the pet only when it detects that the pet is approaching the wire from within the perimeter. Consequently, when the pet does traverse the wire and is outside the perimeter, the pet can reenter the yard without the receiver unit delivering a stimulus to the pet. The conventional pet containment system of the '569 patent is limited in that the polarity pulse contains no information relating to operating instructions for the receiver unit. Consequently, the independent polarity pulse increases the number of transmitted pulses per signal, which increases the required power to transmit the signal and the required signal processing at the receiver unit. Consequently, a pet containment system that contains a pet within a boundary, that maximizes the pet's usable area within the boundary, that does not discourage the pet from returning to within the boundary in the event the pet moves beyond the boundary, and that does so without utilizing an independent polarity pulse is desired.

BRIEF SUMMARY OF THE INVENTION

In accordance with the various features of the present invention there is provided an animal containment system for containing an animal within a boundary, for maximizing the animal's usable area within the boundary, for not discouraging the animal from returning to within the boundary in the event the animal moves beyond the boundary, and for doing so without utilizing an independent polarity indicator. The animal containment system includes a signal generator, a wire, and a rover unit. The signal generator is in electrical communication with the wire and in wireless communication with the rover unit. The wire defines a boundary. The signal generator generates an activation signal and modulates the signal utilizing amplitude modulation such that the modulation indicates the polarity of the activation signal. The signal generator wirelessly transmits the activation signal by way of the wire such that the transmitted activation signal generates a magnetic field about the wire. Consequently, the polarity of the activation signal within the boundary is substantially opposite the polarity of the activation signal beyond the boundary.

The rover unit is carried by the animal, receives the activation signal, analyzes the modulation of the activation signal, and determines the polarity of the activation signal at the location it was received. Considering the above-discussion, when the rover unit determines the polarity of the activation signal, it determines whether the rover unit, and incidentally the animal, is within the boundary or beyond the boundary. Consequently, the animal containment system determines whether the animal is within the boundary or beyond the boundary without utilizing an independent polarity indicator, such as a polarity bit or polarity pulse. When the rover unit determines that the animal is within the boundary, the rover unit does not deliver a stimulus to the animal, regardless of the distance between the rover unit and the wire. When the rover unit determines that the animal traversed the wire from within the boundary, that is, moved from within the boundary to beyond the boundary, the rover unit delivers a stimulus to the animal, encouraging the animal to return to within the boundary. Consequently, the animal containment system contains the animal within the boundary and maximizes the animal's usable area within the boundary. When the rover unit determines that the animal traversed the wire from beyond the boundary, that is, moved from beyond the boundary to within the boundary, the rover unit does not deliver a stimulus to the animal. Consequently, the animal containment device does not discourage the animal from returning to within the boundary in the event the animal moves beyond the boundary.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

The present invention provides an animal containment system for containing an animal within a boundary, for maximizing the animal's usable area within the boundary, for not discouraging the animal from returning to within the boundary in the event the animal moves beyond the boundary, and for doing so without utilizing an independent polarity indicator. The animal containment system determines whether the animal is within the boundary or beyond the boundary by considering the polarity of an activation signal the animal containment system transmits from the boundary and receives at the location of the animal. The animal containment system determines the polarity of the activation signal by modulating the signal such that the modulation indicates the polarity of the activation signal. The animal containment system contains the animal within the boundary by delivering a stimulus to the animal when it traverses the boundary from within the boundary. The animal containment system maximizes the animal's usable area within the boundary by delivering a stimulus to the animal only when it traverses the boundary, such that the animal can be anywhere within the boundary and not receive a stimulus. And the animal containment system does not discourage the animal from returning to within the boundary in the event the animal moves beyond the boundary by not delivering a stimulus to the animal when the animal traverses the boundary from beyond the boundary. One embodiment of the animal containment system constructed in accordance with the various features of the present invention is illustrated generally at 10 in FIG. 1.

Figure 1:
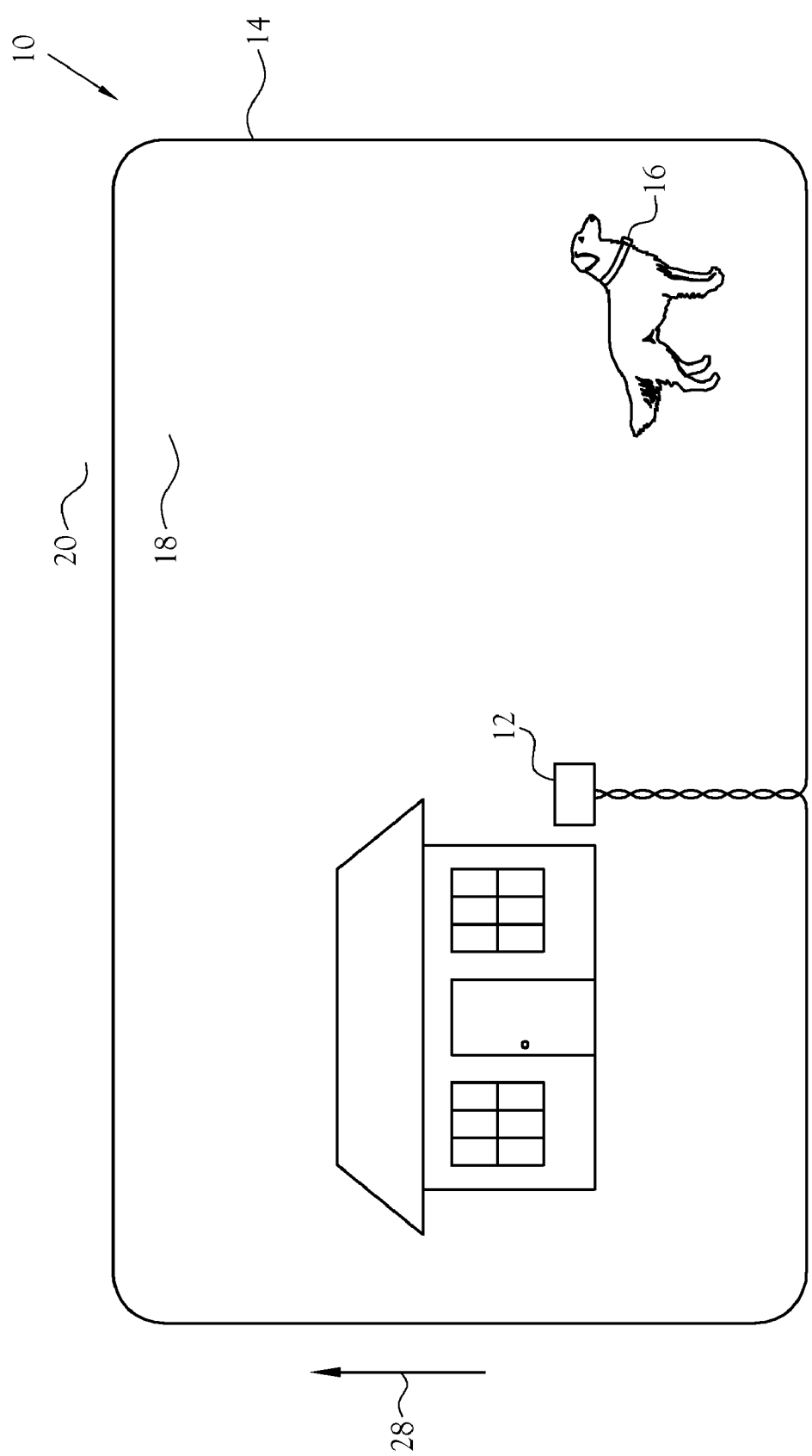
FIG. 1 illustrates one embodiment of the animal containment system in accordance with the various features of the present invention.

The animal containment system 10 of FIG. 1 includes a signal generator 12, a wire 14, and a rover unit 16. The signal generator 12 is in electrical communication with the wire 14 and in wireless communication with the rover unit 16. The wire 14 defines a boundary, which defines an area within the boundary 18 and an area beyond the boundary 20. In the illustrated embodiment, the wire 14 defines the perimeter of a residential yard such that the perimeter of the yard is the boundary, the yard is the area within the boundary 18, and the area outside the yard is the area beyond the boundary 20. Those skilled in the art will recognize that the wire 14 can define a boundary other than the perimeter of a residential yard without departing from the scope and spirit of the present invention. In one embodiment, the wire 14 is buried in the ground such that the wire 14 is not visible from the surface of the ground. The rover unit 16 is carried by the animal. In the illustrated embodiment, the rover unit 16 is mounted to an animal collar and the collar is secured to the animal such that the animal carries the rover unit 16. Those skilled in the art will recognize that the rover unit 16 can be carried by the animal by ways other than an animal collar without departing from the scope or spirit of the present invention.

Figure 2:
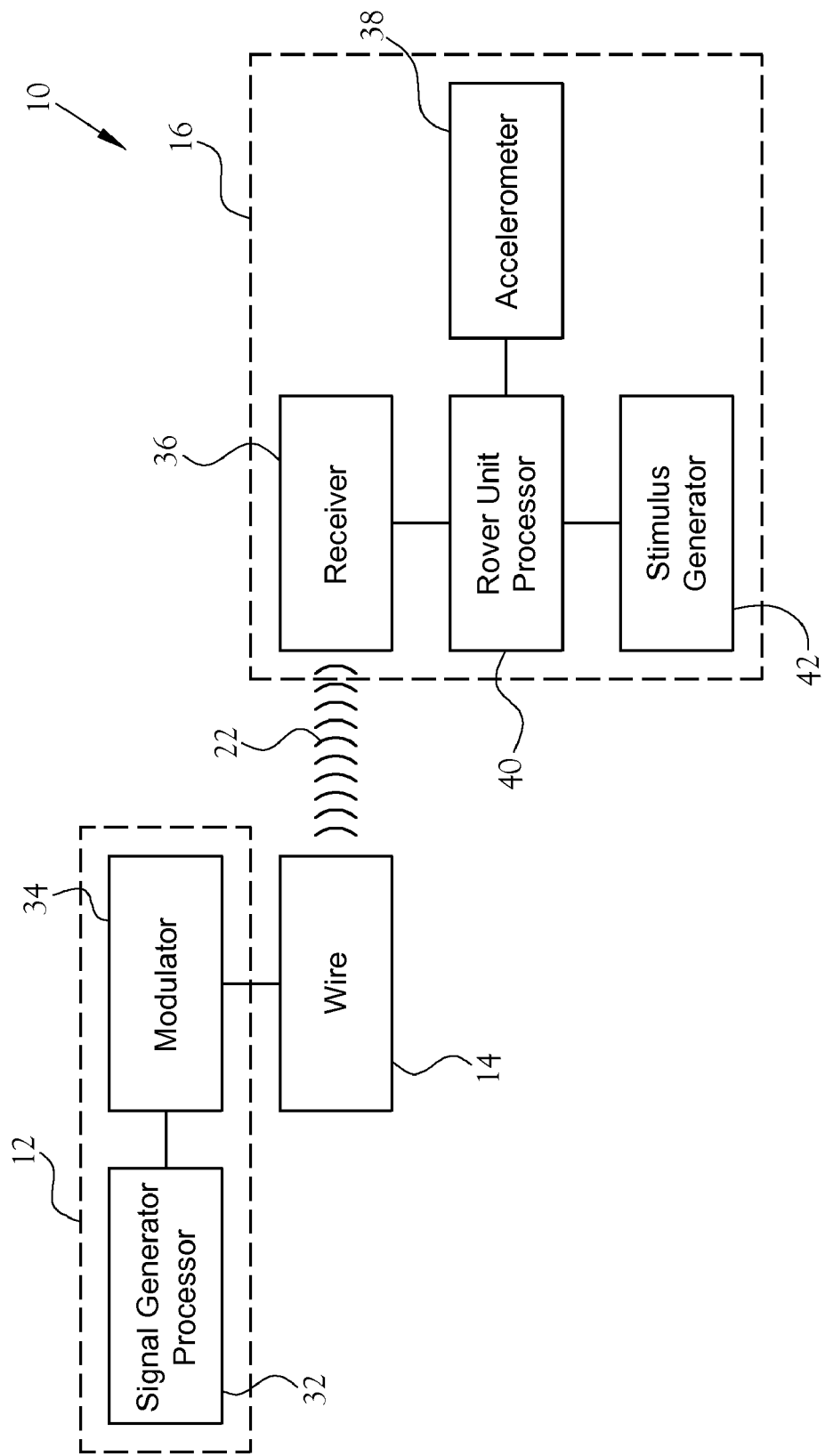
FIG. 2 is a block diagram of one embodiment of the animal containment system of FIG. 1.
Figure 3:
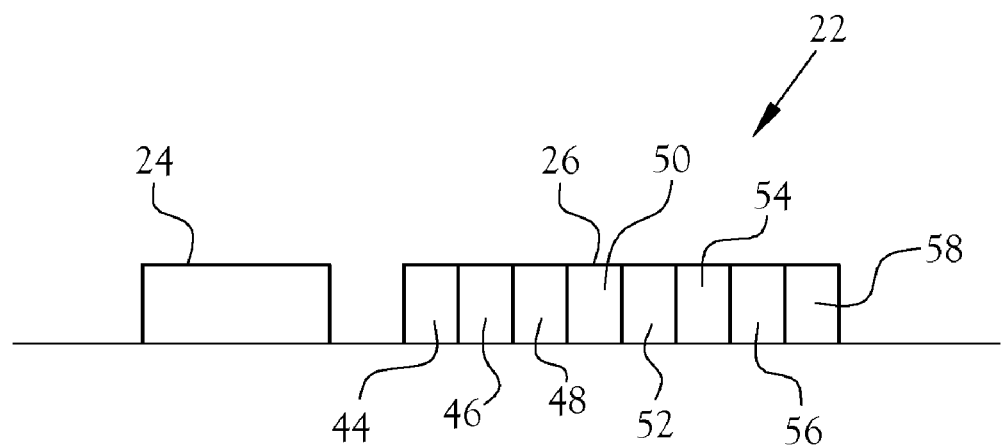
FIG. 3 illustrates one embodiment of the activation signal transmitted and received by the animal containment system.

FIG. 2 is a block diagram of one embodiment of the animal containment system 10 in accordance with the various features of the present invention. In the illustrated embodiment, the signal generator 12 includes a signal generator processor 32 and a modulator 34, whereby the signal generator processor 32 is in electrical communication with the modulator 34. The signal generator processor 32 generates a digital activation signal 22. The activation signal 22 includes operating instructions for the rover unit 16. FIG. 3 illustrates one embodiment of the activation signal 22 in accordance with the various features of the present invention. In the illustrated embodiment, the activation signal 22 includes a header 24 and a plurality of data bits 26. More specifically, the activation signal 22 of the illustrated embodiment includes eight data bits 26, namely a first data bit 44, a second data bit 46, a third data bit 48, a fourth data bit 50, a fifth data bit 52, a sixth data bit 54, a seventh data bit 56, and an eighth data bit 58. The header 24 is used to establish communication with the rover unit 16 by identifying the activation signal 22 as such. The data bits 26 include operating instructions for the rover unit 16. It should be noted that the activation signal 22 can be a digital signal other than the specifically illustrated activation signal 22 of FIG. 3 without departing from the scope or spirit of the present invention. For example, the activation signal 22 does not require the header 24 to remain within the scope or spirit of the present invention. Additionally, the activation signal 22 can include any number of data bits 26 and remain within the scope and spirit of the present invention.

Figure 4:
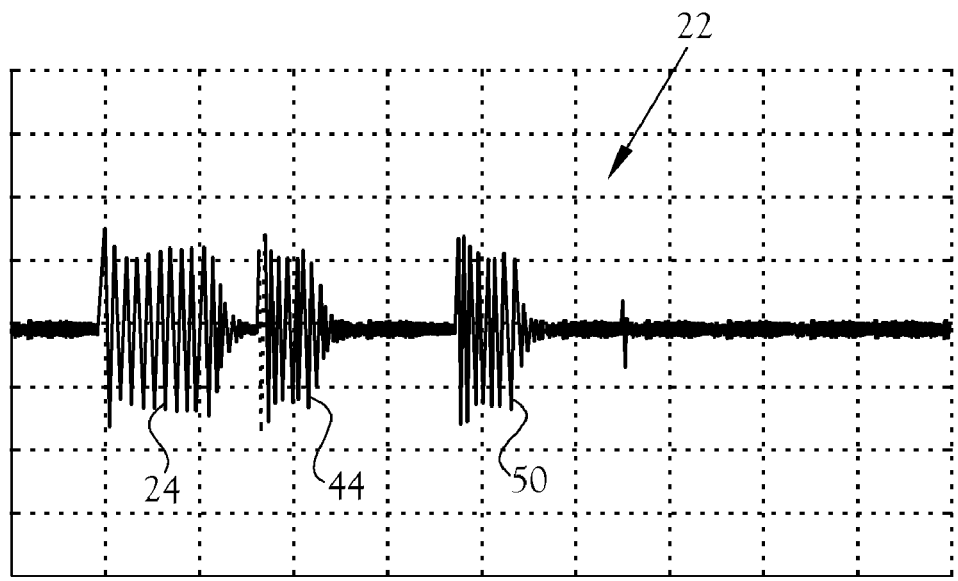
FIG. 4 illustrates one embodiment of the activation signal of FIG. 3 modulated utilizing amplitude modulation.
Figure 5:
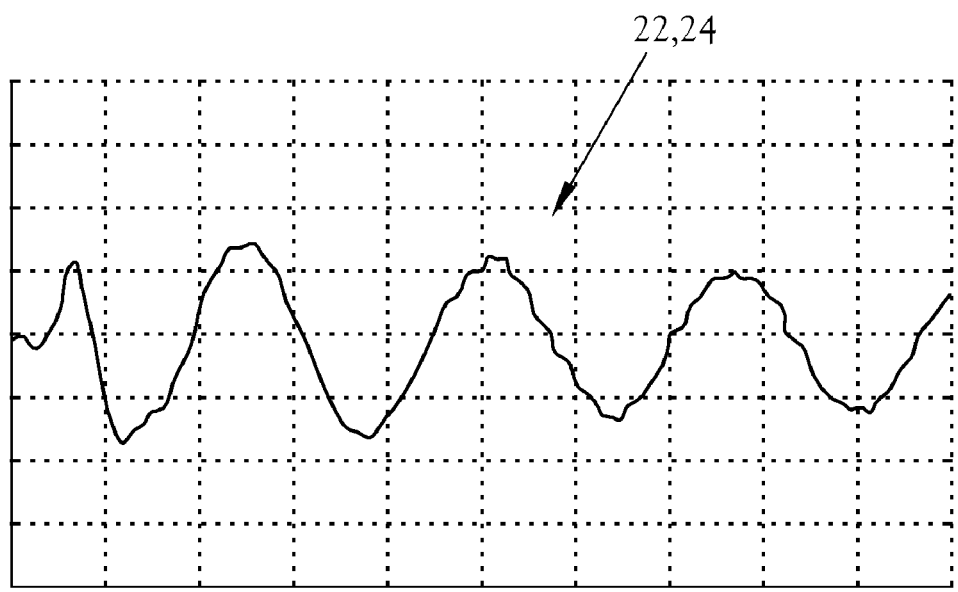
FIG. 5 illustrates a first carrier cycle of the modulated activation signal of FIG. 4.

Considering again FIG. 2, the modulator 34 receives the activation signal 22 from the signal generator processor 32 and modulates the activation signal 22. More specifically, the modulator 34 employs amplitude modulation such that each bit of the activation signal 22 is represented by a plurality of carrier cycles. FIG. 4 illustrates the activation signal 22 of FIG. 3 modulated by the modulator 34, whereby the heading 24, the first data bit 44, and the fourth data bit 50 of activation signal 22 are digital "1's" and the remaining data bits 26 are digital "0's". In the illustrated embodiment of FIG. 4, the modulated header 24 is represented by 17 carrier cycles and each of the modulated data bits 26 are represented by 8 carrier cycles. The signal generator processor 32 dictates the direction of the first carrier cycle for each plurality of carrier cycles. In the illustrated embodiment, the signal generator processor 32 dictates the direction of the first carrier cycle for the modulated header 24 and each of the modulated data bits 26. More specifically, FIG. 5 illustrates the first few cycles of the modulated header 24 of the FIG. 4. In the illustrated embodiment, the signal generator processor 32 causes the first carrier cycle of the modulated header 24 to have a positive direction. Because the direction of the first carrier cycle of the modulated header 24 is positive, the direction of the first carrier cycle of each of the modulated data bits 26 is positive.

Figure 6:
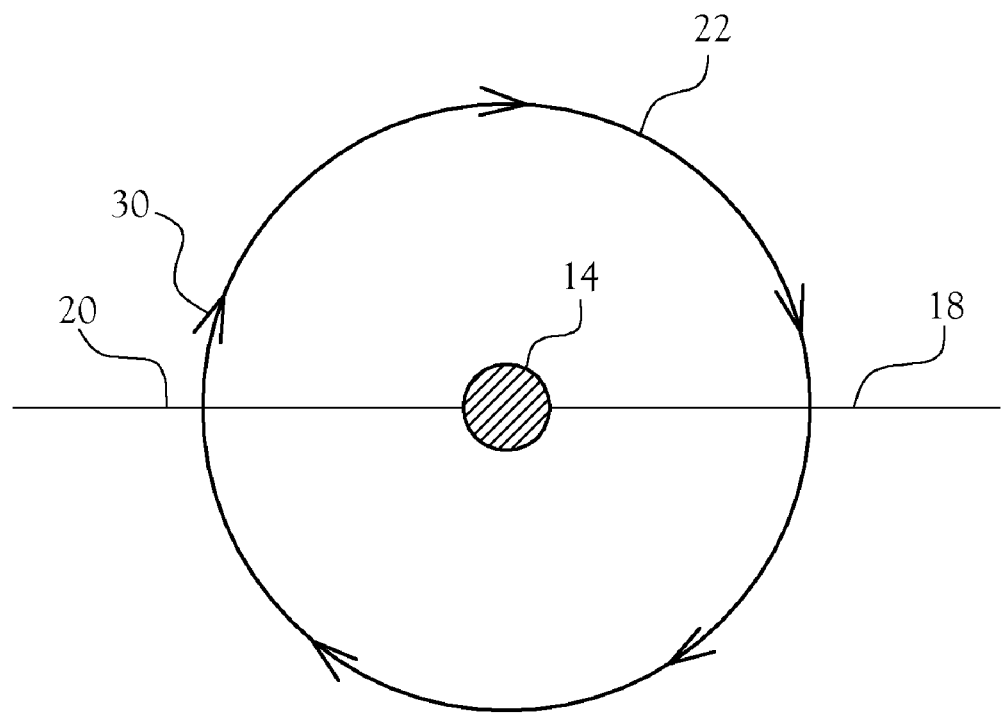
FIG. 6 illustrates a magnetic field generated by the activation signal transmitted by way of the wire of the animal containment system of FIG. 1.

Considering again FIG. 2, after modulating the activation signal 22, the signal generator 12 wirelessly transmits the activation signal 22 by way of the wire 14. More specifically, the signal generator 12 drives current through the wire 14 such that the activation signal 22 radiates from the wire 14 in the form of a magnetic field. In the illustrated embodiment of FIG. 1, the signal generator 12 drives current through the wire 14 in the direction indicated by the arrow at 28. FIG. 6 illustrates a cross-sectional view of the wire 14 whereby the direction indicated by the arrow 28 is into the page. Because the direction of the current driven through the wire 14 is into the page, the resulting magnetic field, that is, the activation signal 22, rotates about the wire 14 in the direction indicated by the arrow at 30. Consequently, the polarity of the activation signal 22 within the boundary 18 is substantially opposite the polarity of the activation signal 22 beyond the boundary 20.

Figure 7:
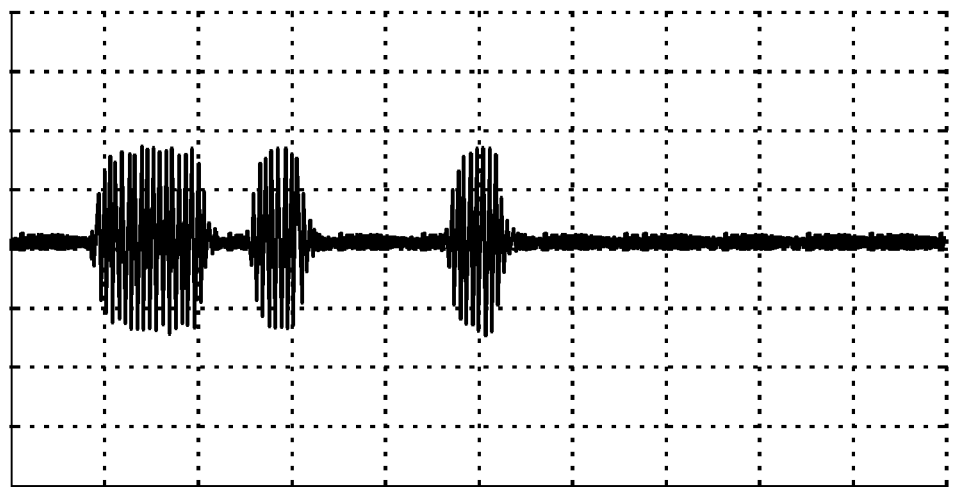
FIG. 7 illustrates the modulated activation signal of FIG. 4 not having an emphasized first carried cycle.
Figure 8:
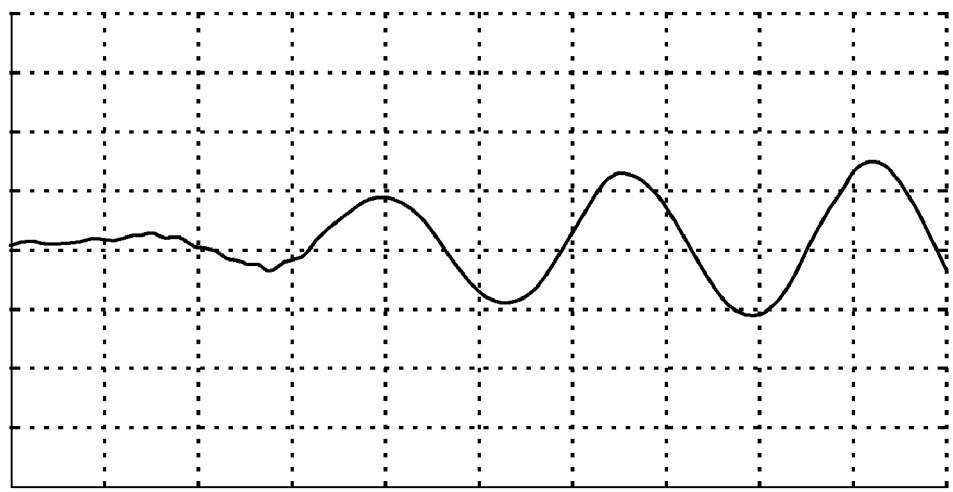
FIG. 8 illustrates an alternate perspective of a first carrier cycle of the modulated activation signal of FIG. 7.

When the signal generator 12 transmits the activation signal 22, the signal generator 12 emphasizes the first carrier cycle of each plurality of carrier cycles. More specifically, the signal generator 12 sharply increases the current driven through the wire 14 when transmitting each first carrier cycle such that the amplitude of the signal 22 at each first carrier cycle sharply increases. Because the amplitude of the first carrier cycle of each plurality of carrier cycles is sharply increased, the first carrier cycle is easily detectable by the rover unit 16 in accordance with subsequent discussion. FIG. 4 illustrates the activation signal 22 having each first carrier cycle emphasized in accordance with the above-discussion. Conversely, FIG. 7 illustrates the activation signal 22 of FIG. 4, whereby each first carrier cycle is not emphasized. As an additional illustration of the above-discussed principle, FIG. 5 illustrates the first few carrier cycles of the modulated header 24 of the activation signal 22 of FIG. 4, and FIG. 8 illustrates the first few carrier cycles of the modulated header 24 of the activation signal 22 of FIG. 7.

Considering again FIG. 2, the rover unit 16 of the illustrated embodiment includes a receiver 36, an accelerometer 38, a rover unit processor 40, and a stimulus generator 42. The receiver 36 and the accelerometer 38 are in electrical communication with the rover unit processor 40, which is in electrical communication with the stimulus generator 42. The receiver 36 is adapted to receive the wirelessly transmitted activation signal 22. In one embodiment, the receiver 36 includes three mutually orthogonal antennas such that the receiver 36 robustly receives the activation signal 22 regardless of the orientation of the rover unit 16. In one embodiment, the receiver 36 includes a tank circuit. The accelerometer 38 indicates the direction of gravity with respect to the orientation of the accelerometer 38. In one embodiment, the accelerometer 38 is a three-axis accelerometer. The receiver 36 and the accelerometer 38 are positioned within the housing of the rover unit 16 such that the orientation of the receiver 36 with respect to the accelerometer 38 is established and stored at the rover unit processor 40. The rover unit processor 40 receives the direction of gravity from the accelerometer 38, considers the orientation of the receiver 36 with respect to the orientation of accelerometer 38, and determines the orientation of the receiver 36 with respect to the direction of gravity and, consequently, determines the orientation of the receiver 36 with respect to the ground.

The rover unit processor 40 receives the activation signal 22 from the receiver 36. Because the signal generator 12 emphasizes each first carrier cycle of the modulated activation signal 22, the rover unit processor 40 detects the direction of each first carrier cycle of the activation signal 22. Because the polarity of the activation signal 22 within the boundary 18 is substantially opposite the polarity of the activation signal 22 beyond the boundary 20, the direction of each first carrier cycle of the activation signal 22 received within the boundary 18 is substantially opposite the direction of each first carrier cycle of the activation signal 22 received beyond the boundary 20. Additionally, the rover unit processor 40 stores information indicative of the direction of each first carrier cycle of the activation signal 22 within the boundary 18 and the direction of each first carrier cycle of the activation signal 22 beyond the boundary 20. Accordingly, the rover unit processor 40 considers the orientation of the receiver 36 with respect to the ground and determines the orientation of the antenna of the receiver 36 that is most perpendicular to the ground. The rover unit processor 40 analyzes the modulation of the activation signal 22 as received by the antenna most perpendicular to the ground. Stated differently, the rover unit processor 40 considers the direction of at least one first carrier cycle of the modulated activation signal 22 with respect to the stored information indicative of the direction of each first carrier cycle of the activation signal 22 within the boundary 18 and the direction of each first carrier cycle of the activation signal 22 beyond the boundary 20. In analyzing the modulation of the activation signal 22, the rover unit processor 40 determines the polarity of the received activation signal 22 without utilizing an independent polarity indicator, such as a polarity bit or polarity pulse. Additionally, in analyzing the modulation of the activation signal 22, the rover unit processor 40 determines whether the rover unit 16 is within the boundary 18 or beyond the boundary 20. Because the rover unit 16 is carried by the animal, when the rover unit processor 40 determines that the rover unit 16 is within the boundary 18, the rover unit processor 40 determines that the animal is within the boundary. Similarly, when the rover unit processor 40 determines that the rover unit 16 is beyond the boundary, the rover unit processor 40 determines that the animal is beyond the boundary 20.

The rover unit processor 40 does not activate the stimulus generator 42 when the receiver 36 of the rover unit 16 does not receive the activation signal 22. The receiver 36 does not receive the activation signal 22 when the rover unit 16 is a distance from the wire 14 such that the strength of the activation signal 22 is not sufficient to be detected by the receiver 36. The circumstances at which the receiver 36 does not receive the activation signal 22 include the rover unit 16 being within the boundary 18 and a sufficient distance from the wire 14 and the rover unit 16 being beyond the boundary 20 and a sufficient distance from the wire 14. Additionally, the rover unit processor 40 does not activate the stimulus generator 42 when the receiver 36 receives the activation signal 22 and determines that the rover unit 40 is within the boundary 18, regardless of the distance between the rover unit 16 and the wire 14. Conversely, when the rover unit processor 40 determines that the rover unit 16 is within the boundary 18 and subsequently determines that the rover unit 16 is beyond the boundary 20, the rover unit processor 40 activates the stimulus generator 42. When the stimulus generator 42 is activated, it delivers a stimulus to the animal until the rover unit processor 40 deactivates the stimulus generator 42. The rover unit processor 40 deactivates the stimulus generator 42 when the rover unit processor 40 determines that the rover unit 16 is within the boundary 18 or when a predetermined period of time, which begins when the stimulus generator 42 is activated, expires. When the rover unit processor 40 determines that the rover unit 16 is beyond the boundary 20 and the rover unit processor 40 has deactivated the stimulus generator 42 in accordance with the above-discussion, the rover unit processor 40 does not activate the stimulus generator 42.

Considering the above-discussion, the animal can be anywhere within the boundary 18 without the rover unit 16 delivering a stimulus to the animal. Consequently, the animal containment system 10 maximizes the animal's usable area within the boundary 18. Additionally, when the animal traverses the wire 14, that is, moves from within the boundary 18 to beyond the boundary 20, the rover unit 16 delivers a stimulus to the animal until the animal returns from beyond the boundary 20 to within the boundary 18, encouraging the animal to remain within the boundary 18. Consequently, the animal containment system 10 contains the animal within the boundary 18. Additionally, in the event the animal moves beyond the boundary 20 and does not return to within the boundary 18 within the predetermined period of time, the rover unit 16 ceases to deliver a stimulus to the animal. This safety feature prevents the rover unit 16 from delivering an excessive stimulus to the animal when the animal does not return to within the boundary 18 because, for example, the animal becomes confused when the rover unit 16 delivers a stimulus to the animal such that the animal does not return to within the boundary 18. Additionally, when the animal moves beyond the boundary 20 to the extent that the rover unit 16 ceases to deliver a stimulus to the animal, the animal returns to within the boundary 18 without the rover unit 16 delivering a stimulus to the animal. Consequently, in the event the animal moves beyond the boundary 20, the animal containment system 10 does not discourage the animal from returning to within the boundary 20.

In an alternate embodiment, the animal containment system 10 prevents the animal from entering the area within the boundary 18. More specifically, the rover unit processor 40 does not activate the stimulus generator 42 when the receiver 36 of the rover unit 16 does not receive the activation signal 22. The receiver 36 does not receive the activation signal 22 when the rover unit 16 is a distance from the wire 14 such that the strength of the activation signal 22 is not sufficient to be detected by the receiver 36. The circumstances at which the receiver 36 does not receive the activation signal 22 include the rover unit 16 being within the boundary 18 and a sufficient distance from the wire 14 and the rover unit 16 being beyond the boundary 20 and a sufficient distance from the wire 14. Additionally, the rover unit processor 40 does not activate the stimulus generator 42 when the receiver 36 receives the activation signal 22 and determines that the rover unit 40 is beyond the boundary 20, regardless of the distance between the rover unit 16 and the wire 14. Conversely, when the rover unit processor 40 determines that the rover unit 16 is beyond the boundary 20 and subsequently determines that the rover unit 16 is within the boundary 18, the rover unit processor 40 activates the stimulus generator 42. When the stimulus generator 42 is activated, it delivers a stimulus to the animal until the rover unit processor 40 deactivates the stimulus generator 42. The rover unit processor 40 deactivates the stimulus generator 42 when the rover unit processor 40 determines that the rover unit 16 is beyond the boundary 20 or when a predetermined period of time, which begins when the stimulus generator 42 is activated, expires. When the rover unit processor 40 determines that the rover unit 16 is within the boundary 18 and the rover unit processor 40 has deactivated the stimulus generator 42 in accordance with the above-discussion, the rover unit processor 40 does not activate the stimulus generator 42.

Considering the alternate embodiment of the animal containment system 10, the animal can be anywhere beyond the boundary 20 without the rover unit 16 delivering a stimulus to the animal. Additionally, when the animal traverses the wire 14, that is, moves from beyond the boundary 20 to within the boundary 18, the rover unit 16 delivers a stimulus to the animal until the animal returns from within the boundary 18 to beyond the boundary 20, encouraging the animal to remain beyond the boundary 20. Consequently, the animal containment system 10 prevents the animal from entering the area within the boundary 18. Additionally, in the event the animal moves within the boundary 18 and does not return to beyond the boundary 20 within the predetermined period of time, the rover unit 16 ceases to deliver a stimulus to the animal. This safety feature prevents the rover unit 16 from delivering an excessive stimulus to the animal when the animal does not return to beyond the boundary 20 because, for example, the animal becomes confused when the rover unit 16 delivers a stimulus to the animal such that the animal does not return to beyond the boundary 20. Additionally, when the animal moves within the boundary 18 to the extent that the rover unit 16 ceases to deliver a stimulus to the animal, the animal returns to beyond the boundary 20 without the rover unit 16 delivering a stimulus to the animal. Consequently, in the event the animal moves within the boundary 18, the animal containment system 10 does not discourage the animal from returning to beyond the boundary 18.

From the foregoing description, those skilled in the art will recognize that an animal containment system for containing an animal within a boundary offering advantages over the prior art has been provided. The animal containment system determines whether the animal is within the boundary or beyond the boundary by considering the polarity of an activation signal the animal containment system transmits from the boundary and receives at the location of the animal. The animal containment system determines the polarity of the activation signal by modulating the signal such that the modulation indicates the polarity of the activation signal. The animal containment system contains the animal within the boundary by delivering a stimulus to the animal when it traverses the boundary from within the boundary. The animal containment system maximizes the animal's usable area within the boundary by delivering a stimulus to the animal only when it traverses the boundary. Consequently, the animal can be anywhere within the boundary and not receive a stimulus. And the animal containment system does not discourage the animal from returning to within the boundary in the event the animal moves beyond the boundary by not delivering a stimulus to the animal when the animal traverses the boundary from beyond the boundary.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A method for determining the location of a rover unit with respect to a boundary in an animal training system, said method comprising the steps of:
    defining the boundary using a wire, the boundary defining an area within the boundary and an area beyond the boundary, one of said area within the boundary and said area beyond the boundary being designated as a permitted area and the other being designated as a restricted area;
    providing a rover unit to be worn by the animal;
    generating an activation signal having a plurality of data bits; modulating the activation signal such that each data bit of the plurality of data bits in the activation signal is represented by a plurality of carrier cycles;
    dictating polarity of the first carrier cycle of said plurality of carrier cycles for each data bit of the plurality of data bits;
    emphasizing the first carrier cycle of the activation signal;
    transmitting the activation signal by way of the wire such that the activation signal generates a magnetic field about the wire, the activation signal having a polarity within the boundary that is substantially opposite its polarity beyond the boundary;
    storing at the rover unit information indicative of the polarity of the activation signal within the boundary and the polarity of the activation signal beyond the boundary;
    receiving the activation signal at the location of the rover unit;
    analyzing the polarity of the activation signal with respect to the dictated polarity to determine whether the polarity corresponds to the polarity of the activation signal within the boundary or the polarity of the activation signal beyond the boundary;
    not delivering a stimulus to the animal while the modulation of the activation signal with respect to the information indicative of the polarity of the activation signal indicates the rover unit is in the permitted area;
    delivering a stimulus to the animal when the modulation of the activation signal with respect to the information indicative of the polarity of the activation signal indicates the rover unit moved from the permitted area to the restricted area; and
    not delivering a stimulus to the animal when the modulation of the activation signal with respect to the information indicative of the polarity of the activation signal indicates the rover unit moved from the restricted area to the permitted area.

2. The method of claim 1 wherein said step of modulating includes modulating the activation signal using amplitude modulation.

3. The method of claim 1 wherein said step of analyzing includes considering the direction of the first carrier cycle of the activation signal.

4. The method of claim 1 wherein said step of modulating includes emphasizing the first carrier cycle of each plurality of carrier cycles in the activation signal.

5. The method of claim 4 wherein emphasizing the first carrier cycle includes sharply increasing the amplitude of each first carrier cycle.

6. The method of claim 1 wherein said step of receiving includes receiving the activation signal using a receiver of the rover unit, the receiver having at least one antenna.

7. The method of claim 6 wherein said step of receiving includes determining the orientation of the receiver with respect to the ground.

8. The method of claim 7 wherein said step of receiving includes receiving the activation signal using the antenna of the at least one antenna most perpendicular to the ground.

9. The method of claim 1 wherein the activation signal does not include an independent polarity indicator.

10. The method of claim 9 wherein the independent polarity indicator includes a polarity bit.

11. The method of claim 9 wherein the independent polarity indicator includes a polarity pulse.

12. The method of claim 1 wherein the permitted area is within the boundary and the restricted area is beyond the boundary.

13. The method of claim 1 wherein the permitted area is beyond the boundary and the permitted area is beyond the boundary.

14. The method of claim 1 wherein emphasizing the first carrier cycle includes sharply increasing the amplitude of the first carrier cycle in the activation signal.

15. The method of claim 1 wherein emphasizing the first carrier cycle includes sharply increasing the current of the first carrier cycle of the activation signal.

16. The method of claim 1 wherein emphasizing the first carrier cycle includes sharply increasing the current of the first carrier cycle of each plurality of carrier cycles of the activation signal.

* * * * *